UNITED STATES PATENT OFFICE

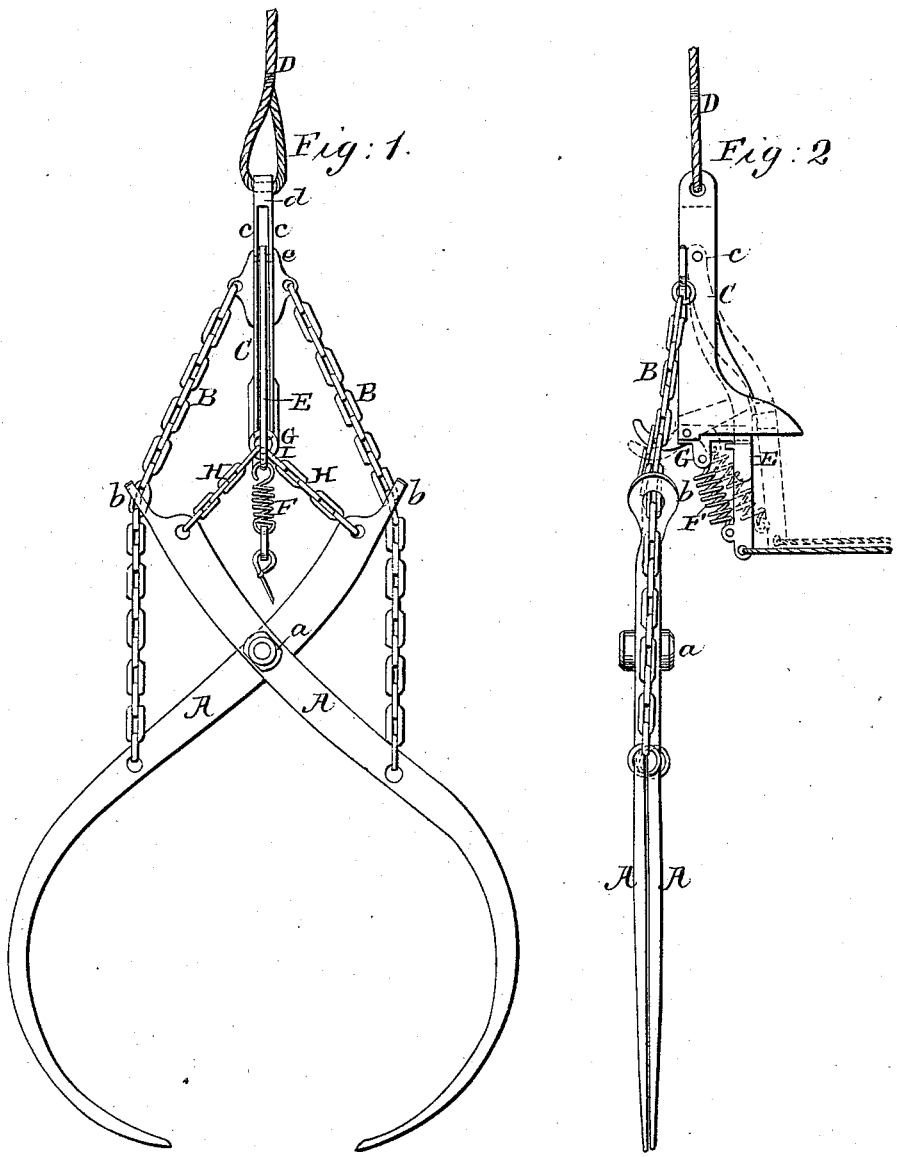

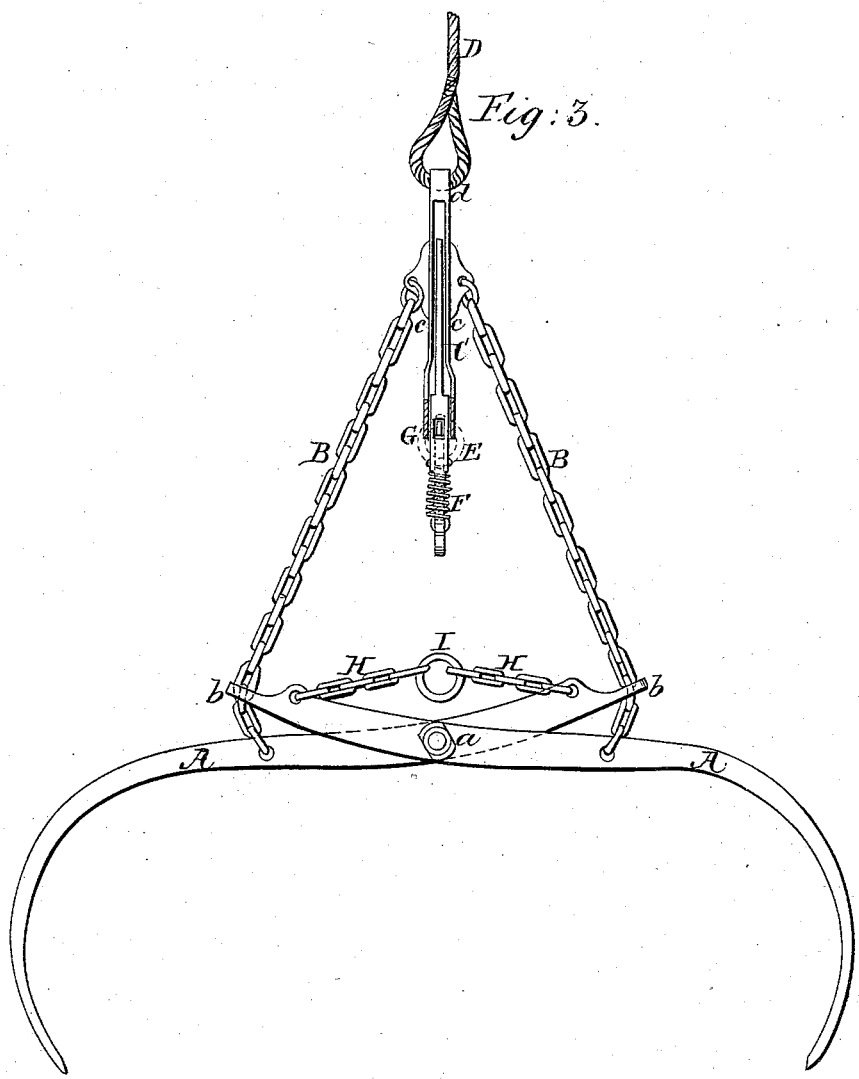

LEVI A. BEARDSLEY, OF SOUTH EDMESTON, NEW YORK.

IMPROVEMENT IN HAY-ELEVATING FORKS.

Specification forming part of Letters Patent No. 33,288, dated September 17, 1861.

*To all whom it may concern:*

Be it known that I, LEVI A. BEARDSLEY, of South Edmeston, in the county of Otsego and State of New York, have invented a new and Improved Hay-Elevating Fork; and I do hereby declare that the following is a full, clear, and exact description of the same, reference being had to the annexed drawings, making a part of this specification, in which—

Figure 1 is a side view of my invention, showing the tines in a closed state. Fig. 2 is an edge view of the same. Fig. 3 is a side view of the same with the tines in an open state after the discharge of the load.

Similar letters of reference indicate corresponding parts in the several figures.

This invention consists in combining a spring with a latch substantially as hereinafter described, whereby the casual liberation of the tines from the latch is effectually prevented.

To enable those skilled in the art to fully understand and construct my invention, I will proceed to describe it.

A A represent two curved teeth or tines connected by a fulcrum-pin $a$ near their upper ends, on which the tines are allowed to work freely.

B B are two chains, the lower ends of which are attached to the tines A below the fulcrum-pin $a$. These chains pass through eyes $b\ b$ at the upper ends of the tines above the pin $a$, and are connected to a socket C, to which the fall-rope D is attached. This socket C may be formed of two metal plates $c\ c$, properly secured to cross plates or bars $d$, and within this socket a lever E is fitted and secured by a fulcrum-pin $e$, which passes through its upper end. (See Fig. 2.) The lever E extends down below the socket C; and it is connected by a spiral spring F to a latch G, which is fitted in the lower part of the socket C, and secured therein by a pin or pivot $f$, the outer end of the latch projecting beyond the side of the socket and being of curved form, as shown clearly in Fig. 2. The lever E has an opening $g$ made in it to receive the inner end of the latch G, the spring F retaining the lever on the inner end of the latch, and the latter is consequently held in a horizontal position, ready to hook.

To the upper end of each tine A there is attached a chain H. The upper ends of these chains are connected to a ring I, which, when fitted on the outer curved end of the latch G, retains the tines A A in a closed state, as shown in Fig. 1.

The operation is as follows: The fall-rope D is passed through suitable sheaves or blocks so placed that the implement may be hoisted over the place where the hay is to be deposited. The tines A A are inserted into a mass of hay which is to be elevated, and the ring I of the chains H H is placed on the curved end of the latch G. The latch G and chains H H retain the tines A A in a closed state while the implement is being hoisted, and when the implement reaches the desired point of elevation the operator or attendant, by means of a suitable cord, draws out the lower end of lever E, and thereby releases the inner end of latch G, and the chains H and the tines A A will be distended in consequence of the attachment of the chains B B thereto, (see Fig. 3,) and the load will be at liberty to drop from the tines. The chains B, it will be understood, have a tendency to distend the lower parts of the tines, while the chains H have a tendency to keep them closed. The chains B, in consequence of passing through the eyes $b$ at the upper ends of the tines, keep the the latter from turning at the points of attachment of the chains B to the tines A, and the spring F prevents the casual movement of lever E from the latch G.

This invention admits of two tines only being used, whereas in the previously-patented invention four tines were employed, in order to admit of the load being nearly balanced or to facilitate the balancing thereof to prevent the turning of the implement as it is elevated. Two tines, however, can be fastened on each side near the point where the side chains are fastened and bowed out with a rod running between them as a brace.

Ropes can be used instead of chains B for opening the tines.

Having thus described my invention, what I claim as new, and desire to secure by Letters Patent, is—

The connecting of the lower end of the lever E with the latch G by means of a spring F, substantially as shown, making the same self-adjusting and preventing the casual detachment of the latch from the lever, as described.

LEVI A. BEARDSLEY.

Witnesses:
JOHN T. WHITE,
ELEAZER R. FULLER.